(12) United States Patent
Dobrowolski

(10) Patent No.: US 7,235,136 B2
(45) Date of Patent: Jun. 26, 2007

(54) DEVICE FOR READING THE ROTATIONAL SPEED OF A PAINT SPRAYER PROVIDED WITH A ROTATING BOWL

(75) Inventor: Flavien Dobrowolski, Sinard (FR)

(73) Assignee: Eisenmann France Sarl (FR)

( * ) Notice: Subject to any disclaimer, the term of this patent is extended or adjusted under 35 U.S.C. 154(b) by 296 days.

(21) Appl. No.: 10/474,844

(22) PCT Filed: Apr. 16, 2002

(86) PCT No.: PCT/FR02/01309
§ 371 (c)(1),
(2), (4) Date: Mar. 4, 2004

(87) PCT Pub. No.: WO02/086515
PCT Pub. Date: Oct. 31, 2002

(65) Prior Publication Data
US 2004/0134424 A1    Jul. 15, 2004

(30) Foreign Application Priority Data
Apr. 20, 2001    (FR) .................................. 01 05408

(51) Int. Cl.
B05C 11/10 (2006.01)
(52) U.S. Cl. .................... 118/704; 118/713; 250/559.49
(58) Field of Classification Search ................ 118/323, 118/704, 627, 629; 239/700; 250/559.49
See application file for complete search history.

(56) References Cited

U.S. PATENT DOCUMENTS 3,323,120 A * 5/1967 Uehlin et al. .................. 341/7
4,899,936 A * 2/1990 Weinstein .................... 239/224
4,965,444 A   10/1990 Howe
5,704,977 A    1/1998 Baumann et al.
6,056,215 A * 5/2000 Hansinger et al. .......... 239/703
6,105,886 A * 8/2000 Hollstein et al. ........... 239/700

FOREIGN PATENT DOCUMENTS

| DE | 30 02 206 | 7/1981 |
| DE | 43 06 800 | 9/1994 |
| EP | 0 356 085 | 2/1990 |

OTHER PUBLICATIONS

International Search Report; PCT/FR02/01309; Sep. 18, 2002.

* cited by examiner

Primary Examiner—George Koch
(74) Attorney, Agent, or Firm—Cantor Colburn LLP

(57) ABSTRACT

The invention device measures the instantaneous rotation speed of a turbine (6) which is housed inside the body (3) of the paint sprayer (2) and which rotationally drives the rotating bowl (5) when the paint sprayer is mounted on the end of an arm (8) of a robot or an analogous multi-axis machine. A disk (10), which is disposed to the rear of the turbine (6) and which rotates therewith, cooperates with the front end (11a) of an optical-fiber-type light guide (11) which is interrupted (11b) at the rear (7) of the body (3) of the paint sprayer (2). Transmitting and receiving optoelectronic means are mounted on the end of the arm on the mounting plane (9) of the paint sprayer, opposite the rear end (11b) of the light guide (11). Said means convert a reflected optical signal which is carried by the optical guide (11) into an electronic signal which is carried by an electric cable (22) placed in the arm (8). The inventive device is suitable for use with machines on automatic painting lines for automotive vehicles.

6 Claims, 2 Drawing Sheets

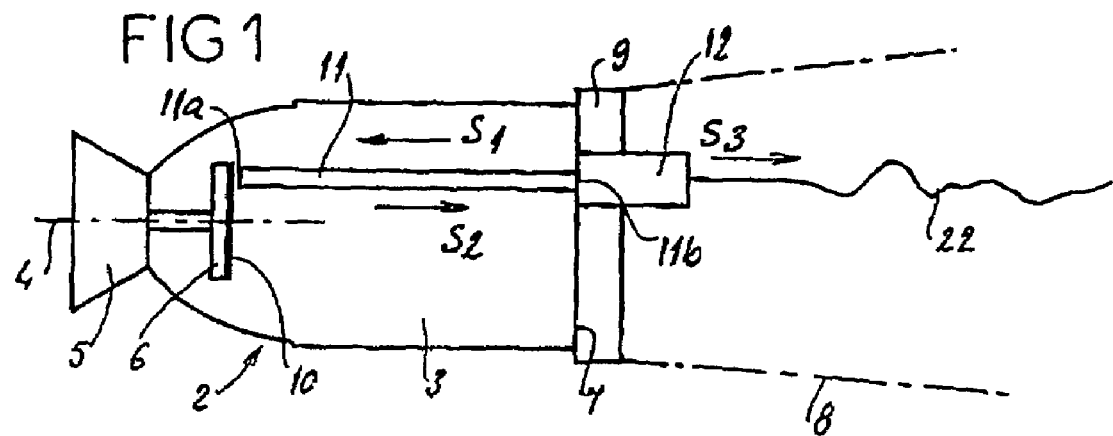
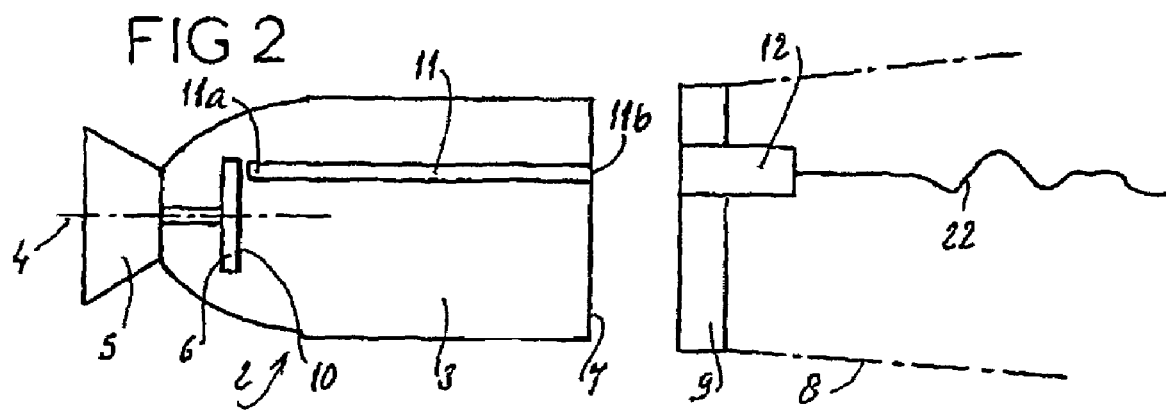
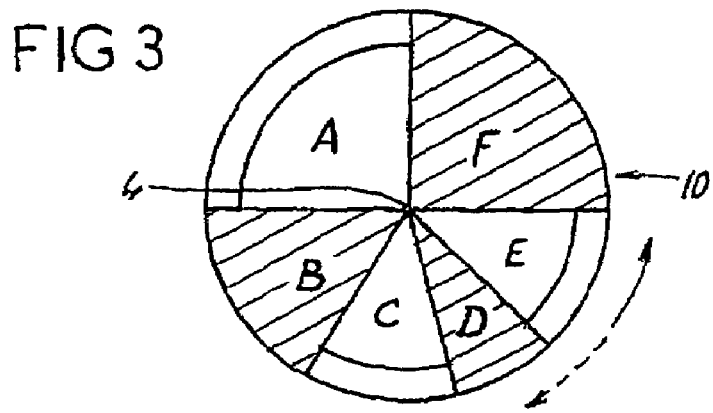

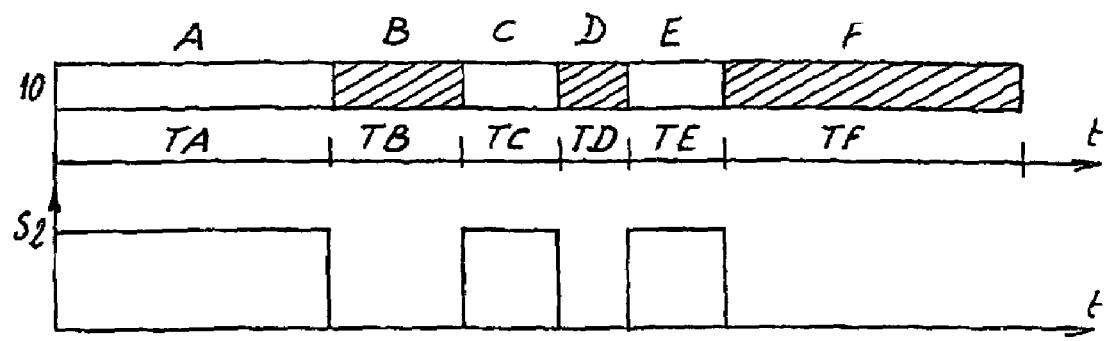
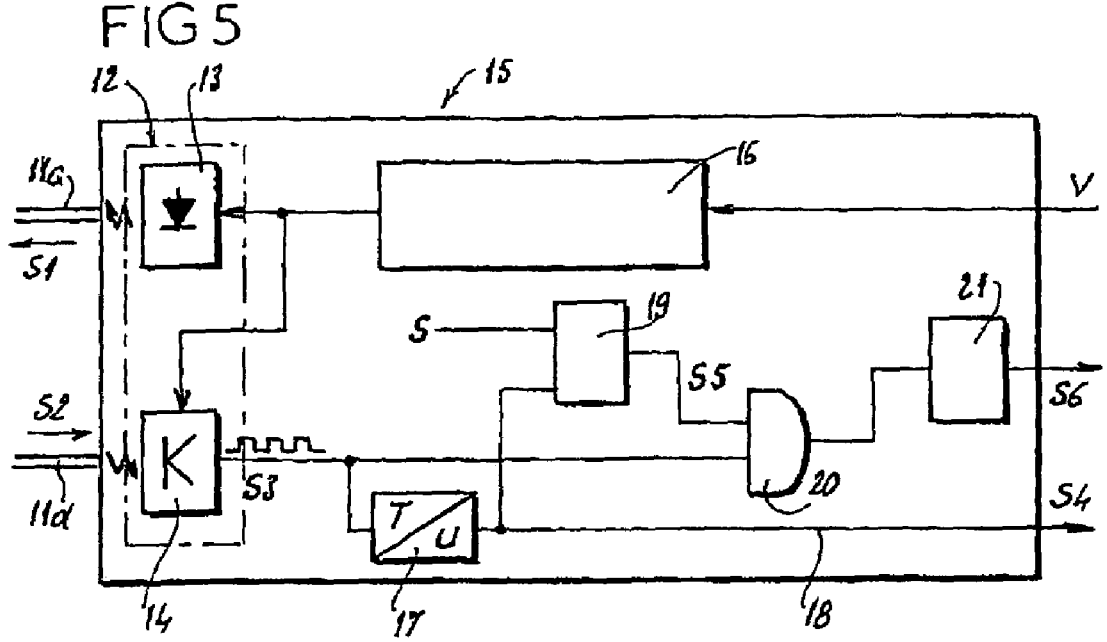

DEVICE FOR READING THE ROTATIONAL SPEED OF A PAINT SPRAYER PROVIDED WITH A ROTATING BOWL

This application is a National Stage of International Application No. PCT/FR02/01309, filed Apr. 16, 2002.

TECHNICAL FIELD OF THE INVENTION

The present invention relates, in a general manner, to the technical field of apparatus for spraying paint, or other similar coating product, comprising a rotating spraying bowl, rotated at high speed, about its axis, by a turbine housed in the body of the sprayer, the turbine being itself rotated by a stream of air. In particular, the invention is concerned with such paint sprayers mounted at the end of a robot arm, or on a similar multi-axis machine, such as used in automated paint lines for motor vehicle bodies. Even more particularly, a subject of this invention is a device for reading speed of rotation of the turbine, hence of the rotating bowl, for paint sprayers of the kind concerned here.

In sprayers of this kind, the turbine, tied rotationally to the revolving bowl, is generally driven in rotation by a flow or a pressure of air delivered by a proportional valve which is itself controlled as a function of the deviation between the actual speed of rotation and the preset value for this speed. A device for reading the actual speed of rotation of the turbine is therefore already necessary, with a view to the regulation of this speed.

Moreover, in the case where the paddle wheel of the turbine comprises braking vanes, the braking of this turbine can be controlled either by an air valve operated in "all or nothing" mode, or by a proportional valve that allows metered braking. In all cases, the control of braking is interrupted well before the complete stoppage of the turbine since, because the system comprises no elements that discriminate the direction of rotation, if the turbine were to rotate in the reverse direction, that is to say in the direction of the braking action, the injection of air with a view to the braking would merely accelerate the rotation in the wrong direction, and it would no longer be possible to stop the turbine.

Now, for the safety of the service personnel, it is not possible for the latter to enter the paint booths, as long as the turbines of the sprayers have not stopped. If braking is interrupted for example at a speed of rotation of 10,000 rpm, it would still be necessary to wait many tens of seconds before the turbine stops by itself. Thus, appropriate monitoring of the speed of rotation of the turbine, if possible with discrimination of the direction of rotation, is also desirable during the braking phases, for safety reasons.

In practice, to embody the device for reading the speed of rotation of the turbine, the following requirements have to be complied with:

The cue relating to the speed must be transmitted remotely from the sprayer; passing through the arm of the robot or of the painting machine.

The device for remote transmission of the signal indicative of the speed must be able to be connected/disconnected very quickly, so as to allow the exchange of a sprayer without immobilizing the production line for too long.

Insofar as a high electric voltage of the order of 10,000 kvolts is generally used on the sprayer, in order to electrically charge the paint which is of the electrostatic type, the speed reading device must be of the type with galvanic isolation between the high voltage and the measurement signal proportional to the speed, thereby entailing recourse to optical solutions for example.

For this purpose, it is already known to provide, at the rear of the turbine, a disk rotating with this turbine, facing which disk is positioned the end of an optical fiber, this state of the art being indicated for example in patent U.S. Pat. No. 5,704,977 (or its equivalent, German patent DE 4306800 C2). The rotating disk has a succession of opaque and reflecting zones so that the light emitted by a light source can be reflected and conducted by an optical fiber up to a sensor making it possible to detect at each instant the presence of reflected light or otherwise. Thus, in general, the speed measurement obtained is in the form of a frequency signal, the frequency of which is the image of the speed of rotation of the turbine. Conventional systems for regulating speed of rotation set out to measure this frequency by counting the number of "pips" over a given time. The theory of feedback systems specifies that in order to obtain high-performance regulation, that is to say accurate, fast and stable, it is vital for the sampling time, that is to say the time interval between two successive measurements, to be small compared with the overall response time of the system. Now, in the measurement principle defined above, it is necessary to have a significant number of "pips" in order for the measurement to be accurate, this entailing a lengthening of the speed measurement time. Thus at 12,000 rpm, for a disk on which a white zone and a dark zone have been etched, there are only 20 "pips" per second, which implies that for a measurement time of 100 ms, there are only 2 "pips". The consequence is that the sampling period cannot be reduced sufficiently, even if the number of opaque and reflecting zones present on the rotating disk is increased.

According to a possibility indicated in the aforementioned documents, the end of the arm of the painting robot carries a rigid optical fiber which, when the sprayer is in place, passes through the body of this sprayer from the rear to the front and emerges, via its front free end, facing the disk rotationally tied to the turbine. This solution avoids the need for recourse to an optical connection, but it has the major drawback that should the sprayer be withdrawn, the projecting rigid optical fiber represents a danger to the people involved, and is itself at risk of being damaged by contacts or impacts.

According to another solution, described in detail in the aforementioned documents, a first rigid optical fiber is mounted in the body of the sprayer, this optical fiber running from the disk tied to the turbine up to the rear of the sprayer. Another optical fiber is mounted in the arm of the painting robot, up to the end of this arm, to which end the sprayer is detachably fixed. At the level of the mounting plane of the sprayer, there is provided an optical fiber connector enabling the rear end of the first optical fiber, housed in the body of the sprayer, to be coupled mechanically to the front end of the other optical fiber, mounted in the arm of the robot. This solution avoids the need for a projecting optical fiber at the front of the arm of the robot, when the sprayer is withdrawn. However, it requires a specific additional component, namely the optical fiber connector, as well as manual connection/disconnection operations.

Moreover, in both of the known solutions alluded to above, an optical fiber runs over the length of the arm of the painting robot. Now, such an optical fiber is poor at resisting the flexion movements and especially the torsional movements to which it is subjected on account of the movements of the arm, in the course of the operation of the painting robot.

BRIEF SUMMARY OF INVENTION

The present invention aims to avoid all the drawbacks set forth above, by providing, in respect of a paint sprayer with rotating bowl, an improved device for reading speed of rotation, allowing easy withdrawal of the sprayer without requiring an optical fiber connector, a single optical fiber being sufficient and the problems of optical fiber torsion in the arm being eliminated.

For this purpose, the subject of the invention is essentially a device for reading speed of rotation for a paint sprayer with rotating bowl, rotated by a turbine housed in the body of the sprayer, mounted at the end of a robot arm or on a similar multi-axis machine, the reading device using a disk situated at the rear of the turbine, and rotating with this turbine, which cooperates with the front end of at least one light guide of the optical fiber kind passing through the body of the sprayer, this reading device being characterized in that said light guide, of the optical fiber kind, is interrupted at the rear of the body of the sprayer, and in that there are provided on the mounting plane of the sprayer, at the end of the robot or similar multi-axis machine arm, optoelectronic emitter and receiver means, situated facing the rear end of said light guide and including in particular means for converting the reflected optical signal, conveyed by the light guide of the sprayer, into an electrical signal, while at least one electric cable provided for conveying the electrical signal resulting from said conversion is placed in the robot or similar multi-axis machine arm.

Thus, the basic idea of the present invention consists in locating the optoelectronic means of conversion, emitters and also receivers, at the level of the mounting plane of the sprayer, directly opposite the rear face of the sprayer (when the latter is set in place) and, more particularly, opposite the back end of the light guide, such as optical fiber, incorporated in the sprayer. No other optical fiber is necessary in the arm of the robot, where the signal representative of the speed sensed is an electrical signal, conveyed by a low-voltage electric cable of the "robotic" type, available commercially, which can without problem accept the flexions and torsions to which it is subjected during the movements of the arm. Moreover, the conversion of the optical signals into electrical signals being performed at the level of the mounting plane of the sprayer, any connecting of optical fibers at this level is rendered unnecessary. The optoelectronic means currently available, such as laser emitter, are of sufficiently restricted dimensions to be able to sit at the end of the robot arm, while taking account also of the connections, in particular of the electrical and air circuits, and also, of course, of the paint inlet, to be effected at the level of the mounting plane of the sprayer.

According to an advantageous embodiment of the device for reading speed of rotation for a paint sprayer, which is the subject of the invention, the, disk situated at the rear of the turbine of the sprayer, and cooperating with the front end of the light guide passing through the body of the sprayer, possesses an alternation of light sectors and dark sectors of different angular breadths, allowing discrimination of the direction of rotation of rotation of the turbine by analyzing the order of succession of the corresponding signals, differentiated by their respective durations.

In practice, here the disk tied to the turbine has alternately white and black sectors, of different angles, and the electronic unit for processing the electrical signals provided by the means for converting the optical signals, automatically analyzes the successions of white and black zones thus detected, so as to determine the instantaneous direction of rotation of the turbine, and to generate a signal representative of this direction of rotation, which is delivered to the speed monitoring module. Thus, both a speed cue and a direction of rotation cue are available, this making it possible to brake the turbine to an almost zero speed, in such a way as to also solve the safety problem set forth above.

Admittedly, when the turbine rotates at very high speed, it may become difficult to distinguish the various sectors of the disk optically and electronically, since the corresponding times become too short. However, this does not constitute a drawback since it is only of benefit to ascertain the direction of rotation of the turbine, at relatively low speed, during the braking phases, where this difficulty no longer exists. Thus, the direction of rotation can be disregarded other than for a measured speed of rotation of the turbine less than a predetermined threshold, for example fixed at 10,000 rpm, beneath which threshold its determination becomes sure and useful.

Advantageously, in order to obtain a measurement of the speed of rotation making it possible to achieve good feedback control of this speed, the electronic unit will not measure the frequency of rotation by counting the number of "pips" but the time between two white and black reference zones describing a complete revolution of the turbine. This time is measurable with each revolution of the turbine and gives an accurate cue regarding the speed, both at low speed and at high speed.

In practice, the electronic part of the device may comprise, at the output of a reception phototransistor, a converter measuring the time taken by the turbine to perform a complete revolution or a fraction of a revolution. The output of the converter thus yields an electrical signal which is the image of the measured speed, and is linked to a line conveying this electrical signal to a module for monitoring the speed of the turbine. This electrical signal is, in particular, an analog signal proportional to the measured speed.

BRIEF DESCRIPTION OF THE DRAWINGS

The invention will be better understood with the aid of the description which follows, with reference to the appended diagrammatic drawing representing, by way of example, a form of execution of this device for reading speed of rotation for a paint sprayer with rotating bowl:

FIG. 1 shows, in the form of a basic diagram, a sprayer mounted at the end of the arm of a painting robot, the assembly being equipped with the device for reading speed of rotation in accordance with the invention;

FIG. 2 represents the same assembly, the sprayer being separated from the robot arm;

FIG. 3 is an end-on view of the disk of the speed reading device;

FIG. 4 is a chart illustrating the signals obtained with the disk of FIG. 3, for a revolution of this disk;

FIG. 5 represents, in the form of a schematic diagram, the electronic part of this speed reading device.

DETAILED DESCRIPTION OF INVENTION

As shown diagrammatically in FIGS. 1 and 2, a paint sprayer with rotating bowl, designated overall by the reference 2, possesses a body 3 at the front of which is rotatably mounted, about a central axis 4, a spraying bowl 5. The rotating bowl 5 is tied rotationally to a turbine 6, housed in the body 3 of the sprayer 2 and subjected to an air stream conducted by pipes (not represented here).

The body 3 of the sprayer 2 is designed to be mounted in a separable manner, via its rear face 7, at the front end of the arm 8 (represented very sketchily) of a painting robot, or similar multi-axis machine. For this purpose, the front end of the arm 8 comprises a coupling plate 9, defining the "mounting plane" against which the sprayer 2 is fixed in a dismountable manner. The plate 9 comprises an assembly of fluidic and electrical connections, not represented here since they do not relate directly to the present invention; these connections including, inter alia, the couplings for the air circuits for rotating and braking the turbine 6. FIG. 1 shows the sprayer 2 mounted at the end of the arm 8, while FIG. 2 shows the same sprayer 2 separated from this arm 8.

The device for reading speed of rotation, which is the subject of the invention, makes it possible to measure the instantaneous speed of rotation of the turbine 6, hence of the rotating bowl 5. Subsidiarily, this device also determines the direction of rotation of the turbine 6.

This speed reading device comprises a disk 10, situated at the rear of the turbine 6, and possibly exhibiting the appearance illustrated in FIG. 3. The surface of the disk 10 is here divided into six sectors designated from A to F, i.e. three light, in particular white, sectors A, C and E, that alternate with three dark, in particular black, sectors B, D and F. These sectors, more particularly the dark sectors B, D and F, possess mutually differing angular breadths, for example:
the dark sector B is 60°;
the dark sector D is 30°;
the dark sector F is 90°.

The light sectors A, C and E may, in this example, possess the following angular breadths:
the light sector A is 90°;
the light sector C is 45°;
the light sector E is also 45°.

Housed inside the body 3 of the sprayer 2, off the central axis 4 of this sprayer, is an optical fiber 11, used as light guide. The optical fiber 11 passes longitudinally through the body 3 of the sprayer 2, the front end 11a of the optical fiber 11 being placed opposite the disk 10, while the rear end 11b of this optical fiber 11 is situated at the level of the rear face 7 of the body 3 of the sprayer 2.

The speed reading device also comprises, mounted at the level of the plate 9 and hence of the "mounting plane" of the sprayer, an optoelectronic subassembly 12 which is both emitter and receiver. This subassembly 12 is arranged, on the plate 9, in such a way as to be opposite the rear end 11b of the optical fiber 11 of the sprayer 2, when this sprayer 2 is mounted on the end of the arm 8 (see FIG. 1).

As shown in greater detail in FIG. 5, the optoelectronic subassembly 12, provided at the level of the "mounting plane", comprises for example, in the guise of emitter component, a light source such as a laser diode 13 and, in the guise of receiver component, a phototransistor 14. The laser diode 13 is placed facing the rear end of the "emission" part 11c of the optical fiber 11. The phototransistor 14 is, for its part, placed facing the rear end of the "reception" part 11d of the optical fiber 11. The two parts, respectively emitter 11c and receiver 11d, of the optical fiber 11, that are represented separated (in an exaggerated manner) in FIG. 5, are advantageously joined together inside the body 3 of the sprayer, so as to constitute a single optical fiber 11.

FIG. 5 again shows the electronic assembly 15 of the speed reading device. This electronic assembly 15 comprises a power supply unit 16, receiving an external supply voltage V, and powering among other things the emission laser diode 13 and the reception phototransistor 14. At the output of the phototransistor 14 there is provided a frequency/voltage converter 17, whose output is directed to:
a line 18 conveying an electrical signal representative of the measured instantaneous speed;
a first input of a comparator 19.

The comparator 19 possesses a second input, receiving a speed threshold value S, for example chosen equal to 10,000 rpm. The output of the comparator 19 is linked to an input of an AND gate 20, the other input of which is linked to the output of the phototransistor 14. Finally, the output of this AND gate 20 is linked to a module 21 for detecting the direction of rotation.

Referring again to FIGS. 1 and 2, the optoelectronic subassembly 12, and the other components that may possibly be associated with this subassembly, are coupled by an electrical cable 22, running inside the arm 8, to the processing and regulating elements placed further to the rear. The electrical cable 22 is in particular a low-voltage cable, of "robotic" type.

The speed reading device described above operates overall in the following manner:

The laser diode 13, powered electrically by the power supply unit 16, emits on the "emission" part 11c of the optical fiber 11 an incident light signal S1, conveyed to the front end 11a of the optical fiber 11. This end 11a seeing the light and dark sectors of the disk 10 alternately "filing past", the "reception" part 11d of the optical fiber 11 receives a chopped reflected light signal S2, in the form of pulses whose mean frequency F is proportional to the speed of rotation of the disk 10, hence of the turbine 6. This reflected signal S2 is received by the phototransistor 14, which converts it into a corresponding chopped electrical signal S3. The converter 17 transforms this signal S3 into an analog, electrical voltage S4, proportional to the frequency of the signal S3, hence to the speed of rotation of the turbine 6. The signal S4 is transmitted, by the line 18, to an external module (not represented) for monitoring the speed of the turbine 6.

In detail, FIG. 4 illustrates (for a revolution of the disk 10) the form of the reflected light signal S2, with its successive pulses whose lengths and intervals correspond to the respective angular breadths of the sectors A to F of the disk 10. The corresponding times are designated by TA, TB, TC, TD, TE and TF respectively. By reason of the differences in angular breadth of the three dark sectors B, D and F, the three corresponding times TB, TD and TF are distinct (these times obviously being variable themselves, according to the speed of rotation of the turbine 6).

According to the direction of rotation of the turbine 6, the sequence of succession of the times TB, TD and TF is different. For a direction of rotation, the sequence is: TB-TD-TF. For the opposite direction of rotation, this sequence becomes: TF-TD-TB. A measurement and analysis of the times TB, TD and TF thus makes it possible to discriminate the direction of rotation of the turbine 6, at least when this turbine rotates at a low enough speed to allow a measurement and a comparison of these times.

Measurement of the time between the start of two successive sectors A, for example, makes it possible to accurately ascertain the speed of rotation of the turbine 6 at each revolution. Thus by way of order of magnitude, for a speed of 1,200 rpm, the time between two successive sectors A is 50 ms, thereby making it possible to have a sampling time small enough to allow high-performance feedback control.

This is implemented in the electronic assembly 15. At every instant, the signal S3 is processed in the converter 17 which measures the time taken by the turbine 6 between two reference zones and which converts this time into an analog electrical signal S4 proportional to this time, hence representative of the speed of rotation. Moreover, the electrical signal S4, the image of the instantaneous speed of rotation of the turbine 6, is compared in the comparator 19 with the predefined speed threshold S. The comparator 19 thus delivers, at its output, a logic signal S5 which, by way of the AND gate 20 also receiving the signal S3, permits detection of the direction of rotation only if the instantaneous speed of rotation is less than the threshold S. In the latter case, the module for detecting the direction of rotation 21 analyzes the electrical signal S3, and it delivers at its output a logic signal S6, for example in the form of a signal of the "all or nothing" type, representative of the direction of rotation of the turbine 6.

When the sprayer 2 is separated from the arm 8, as illustrated in FIG. 2, the optoelectronic subassembly 12 remains in place on the "mounting plane" and is ready to operate, in the manner explained above, with another sprayer equipped in the same manner.

One would not be departing from the scope of the invention, as defined in the appended claims, by modifying:
- the details of the disk 10, in particular the number of sectors or zones of this disk and their angles;
- the nature of the emitter and receiver components of the optoelectronic assembly, which may be replaced by any equivalents, in particular as regards the light source;
- the details of embodiment of the electronic assembly for processing the signals;
- the nature and the particular features of the painting robot, or other multi-axis machine, equipped with this speed reading device.

The invention claimed is:

1. A device for reading speed of rotation for a paint sprayer with rotating bowl, rotated by a turbine housed in a body of the sprayer, mounted at an end of a robot arm or on a multi-axis machine, the reading device using a disk situated at a rear of the turbine, and rotating with this turbine, which cooperates with a front end of at least one light guide of the optical fiber passing through the body of the sprayer, wherein said light guide is interrupted at a rear of the body of the sprayer, and wherein there are provided on a mounting plane are an optoelectronic emitter and receiver means, the mounting plane—being defined by the end of the robot or multi-axis machine arm and against which the sprayer is dismountably fixed, the optoelectronic emitter and receiver means situated facing a rear end of said light guide and including means for converting a reflected optical signal conveyed by the light guide of the sprayer into an electrical signal, while at least one electric cable provided for conveying the electrical signal resulting from said conversion is placed in the robot or similar multi-axis machine arm.

2. The device for reading speed of rotation as claimed in claim 1, wherein an optoelectronic means, provided on the mounting plane of the sprayer, at the end of the robot or similar multi-axis machine arm, comprise in a guise of the optoelectronic emitter means a light source and in a guise of the receiver means a phototransistor, which are placed respectively facing respective rear ends of an "emission" part and an "reception" part of the light guide of the sprayer.

3. The device for reading speed of rotation as claimed in claim 1, wherein the disk situated at the rear of the turbine of the sprayer, and cooperating with the front end of the light guide passing through the body of the sprayer, possesses an alternation of light sectors and dark sectors of different angular breadths, allowing discrimination of a direction of rotation of the turbine by analyzing an order of succession of corresponding signals, differentiated by their respective durations.

4. The device for reading speed of rotation as claimed in claim 3, wherein the direction of rotation is disregarded other than for a measured speed of rotation of the turbine less than a predetermined threshold, in particular during braking phases.

5. The device for reading speed of rotation as claimed in claim 2, wherein an electronic part of the device for reading speed comprises, at an output of the reception phototransistor, a converter measuring time taken by the turbine to perform a complete revolution or a fraction of a revolution.

6. The device for reading speed of rotation as claimed in claim 5, wherein output of the converter yields an electrical signal which is representative of the measured speed, and is linked to a line conveying the electrical signal to a module for monitoring the speed of the turbine, and wherein the electrical signal is an analog signal proportional to the measured speed.

* * * * *